(12) United States Patent
Castleberry (10) Patent No.: US 8,509,224 B2
(45) Date of Patent: Aug. 13, 2013

(54) CELLULAR SIGNAL FORWARDING UTILIZING A PACKET-SWITCHED NETWORK

(75) Inventor: Michael Castleberry, Wheaton, IL (US)

(73) Assignee: Alcatel Lucent, Paris (FR)

( * ) Notice: Subject to any disclaimer, the term of this patent is extended or adjusted under 35 U.S.C. 154(b) by 120 days.

(21) Appl. No.: 13/080,841

(22) Filed: Apr. 6, 2011

(65) Prior Publication Data

US 2012/0257546 A1    Oct. 11, 2012

(51) Int. Cl.
H04L 12/66    (2006.01)

(52) U.S. Cl.
USPC ............................ 370/352; 370/353; 370/401

(58) Field of Classification Search
USPC .................... 370/235, 395.52, 352, 401, 328, 370/329, 353; 455/90.01, 433, 432.1, 552.1, 455/550.1, 553, 1
See application file for complete search history.

(56) References Cited

U.S. PATENT DOCUMENTS

| | | | |
|---|---|---|---|
| 7,689,166 B2 * | 3/2010 | Bugenhagen et al. | 455/11.1 |
| 8,099,041 B1 * | 1/2012 | Bugenhagen et al. | 455/7 |
| 8,145,262 B2 * | 3/2012 | Martinez et al. | 455/552.1 |
| 8,279,868 B2 * | 10/2012 | Martinez et al. | 370/392 |
| 8,290,431 B2 * | 10/2012 | Bugenhagen et al. | 455/11.1 |
| 2006/0262800 A1 * | 11/2006 | Martinez et al. | 370/395.52 |
| 2008/0132164 A1 * | 6/2008 | Bugenhagen et al. | 455/11.1 |
| 2010/0075669 A1 * | 3/2010 | Sparks et al. | 455/433 |
| 2012/0088500 A1 * | 4/2012 | Bugenhagen et al. | 455/426.1 |
| 2012/0178442 A1 * | 7/2012 | Martinez et al. | 455/426.1 |
| 2012/0224485 A1 * | 9/2012 | Payyappilly et al. | 370/235 |
| 2013/0012194 A1 * | 1/2013 | Bugenhagen et al. | 455/426.1 |
| 2013/0044710 A1 * | 2/2013 | Martinez et al. | 370/329 |

OTHER PUBLICATIONS

"Ubiquisys Announces World's First Attocell: a Personal Femtocell for the iPhone" BusinessWire, Jan. 27, 2011 http://w w w .businessw ire.com/new  s/home/20110126005110/en/Ubiquisys-Announces-World%E2%80%99s-Attocell-Personal-FemtocelliPhone.

* cited by examiner

Primary Examiner — Chuong T Ho
(74) Attorney, Agent, or Firm — Duft Bornsen & Fettig, LLP (57) ABSTRACT

Systems and methods are provided for forwarding cellular signaling across a packet-switched network. The system generates signaling according to a cellular protocol for a mobile device and exchanges the cellular signaling with a base station of a home mobile network of the mobile device. The system further detects a triggering condition, encapsulates the cellular signaling in a packet wrapper, and forwards the encapsulated signaling to a virtual base station for the home network via a packet-switched network.

16 Claims, 5 Drawing Sheets

CELLULAR SIGNAL FORWARDING UTILIZING A PACKET-SWITCHED NETWORK

FIELD OF THE INVENTION

The invention relates to the field of communication systems, and in particular, to forwarding cellular signaling.

BACKGROUND

In cellular networks, carriers provide services to mobile devices (e.g., cellular phones) that are registered as subscribers. The cellular network of the carrier that the mobile device subscribes to may also be referred to as the "home mobile network" or "home network" of the device. Staying within the coverage area provided by the home network is typically desirable for mobile users because the home network provides many services that roaming networks (and areas with no coverage) are unable to adequately provide. For example, voice services in a roaming network may be undesirable because of expensive roaming fees. Furthermore, some services may be unavailable to a mobile user while roaming. For example, the home network may provide text or multimedia messaging services (SMS or MMS) that are unavailable at the roaming network. In some circumstances, prospective roaming networks may use technologies that are incompatible with the mobile device itself (e.g., CDMA vs. W-CDMA), and therefore no services at all may be available to the mobile user while outside of the coverage area of the home network.

While home networks provide the widest range of services to the user, a user may often take their mobile device beyond the range of the home network. For example, the home network may be unavailable during an international business trip. During this time, mobile users desire the services provided by the home network, but are unable to register with the home network in order to receive those services.

Existing technologies provide partial solutions to the problem at hand, but each of these technologies has drawbacks. For example, the mobile device may support applications (apps) that allow the user to access the internet and make a Voice over Internet Protocol (VoIP) call. However, VoIP does not allow the user to use all of the features of their device that would normally be available in the home network (e.g., text, picture, and video messaging, location-based services, message-waiting indicators, and various other applications on the device that expect a standard backhaul interface to the carrier).

Another existing solution includes using the mobile device to contact a separate device that signals over licensed bands that the mobile device can interpret (i.e., using existing cellular protocols) and is connected to the internet. Unfortunately, during roaming travel, it may be illegal to signal over a licensed band with one of these separate devices (i.e., because the band is already licensed to another party). Additionally, the range for these separate devices that signal over licensed bands may be undesirably small (e.g., 5 mm or less) in order to minimize their interference with cellular networks that legally use the licensed spectrum.

Thus, it remains a problem to provide services of the home network to mobile devices while they are beyond the home network's coverage area.

SUMMARY

Embodiments described herein enhance a mobile device so that it forwards cellular signaling via a packet-switched network. The mobile device operates in a normal cellular mode with the home network until a triggering condition is detected (e.g., roaming travel). When the triggering condition is detected the mobile device encapsulates the cellular signaling in a packet wrapper, and forwards the encapsulated signaling across a packet-switched network (e.g., an internet) to an enhanced network element for the home network that serves as a virtual base station. The virtual base station unpackages the cellular signaling, and forwards the unpackaged signaling to a serving network element (e.g., MSC) of the home network. The virtual base station also packages signaling from the home network and forwards it to the mobile device, and the mobile device unpackages this signaling from the home network for processing. Thus, services are provided to the mobile device across a packet-switched network, but these services do not need to understand packet-switching protocols (e.g., transport-layer internet protocols such as TCP/IP) to do so. Rather, home network services generate signaling according to standard cellular protocols, which are transparently wrapped and unwrapped from a packetized format by a control system of the mobile device.

One embodiment is a mobile device that comprises a signaling manager and a control system. The signaling manager is operable to exchange cellular signaling with a base station of a home mobile network of the mobile device. The control system is operable to detect a triggering condition, to receive the cellular signaling from the signaling manager responsive to detecting the triggering condition, to encapsulate the cellular signaling in a packet wrapper, and to forward the encapsulated signaling to a virtual base station for the home network via a packet-switched network.

Another embodiment is a virtual base station for a home mobile network. The virtual base station is operable to receive cellular signaling from a packet-switched network encapsulated in a packet wrapper, wherein the cellular signaling has been sent by a mobile device, and to unpackage the cellular signaling from the packet wrapper. The virtual base station is further operable to forward the unpackaged cellular signaling to a serving network element of the home mobile network. The virtual base station is also operable to receive cellular signaling from the serving network element of the home mobile network, to encapsulate the cellular signaling from the home network in a packet wrapper, and to forward the encapsulated signaling to the mobile device via the packet-switched network.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
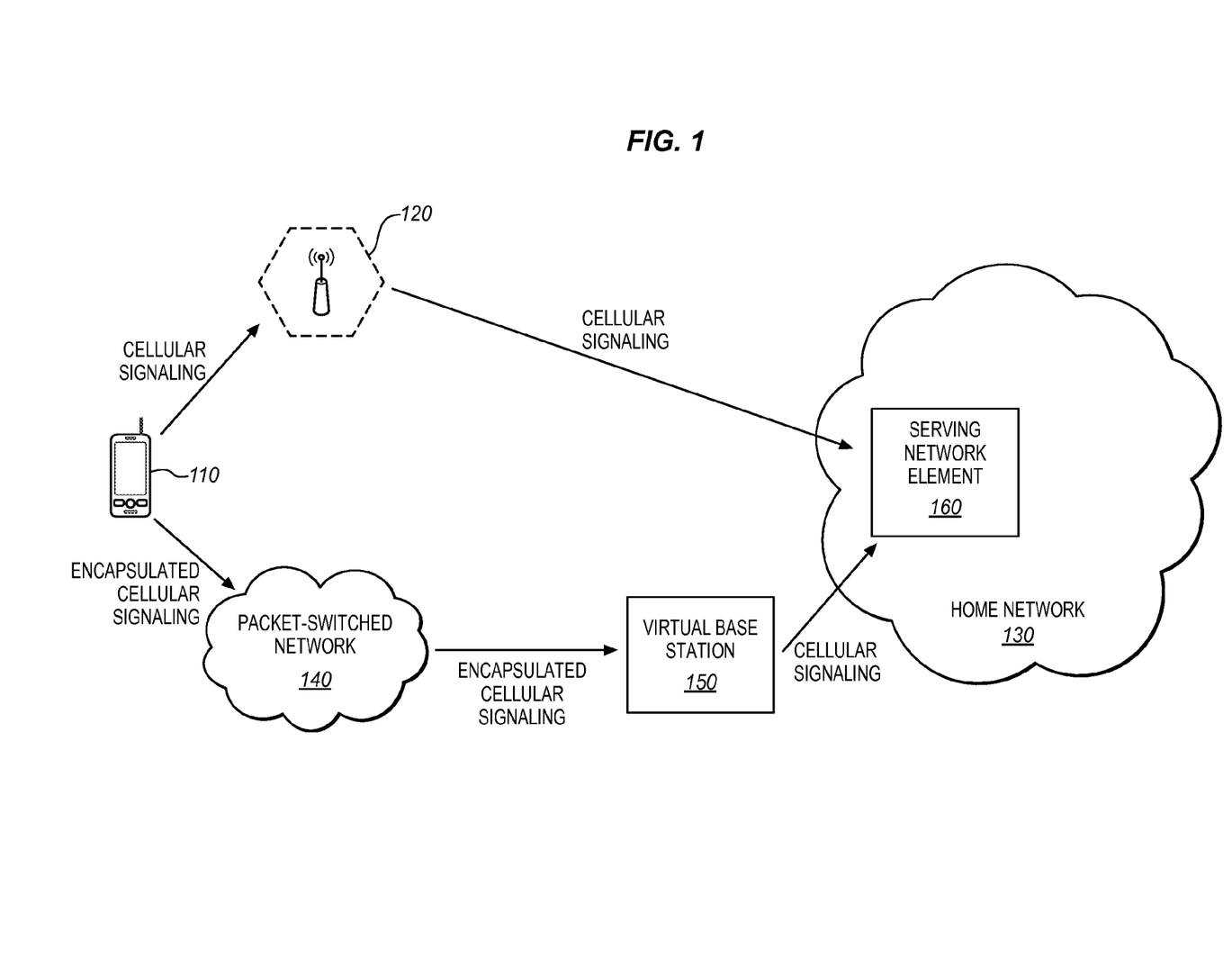
FIG. 1 is a block diagram of a mobile device in communication with a home network in an exemplary embodiment.

FIG. 1 is a block diagram of a mobile device 110 in communication with a home network 130 in an exemplary embodiment. Mobile device 110 comprises any system, device, or component operable to communicate with a base station 120 of home network 130 over an air interface according to a cellular protocol. Home network 130 comprises a cellular or switched telephone network. Mobile device 110 communicates with home network 130 via a cellular protocol (e.g., a non-packet, application-layer protocol) and establishes communications with packet-switched network 140 using a packet-based protocol (e.g., the TCP transport-layer protocol). While in operation, mobile device 110 operates in a cellular mode with base station 120 to communicate with serving network element 160 until a triggering condition is detected. Once the triggering condition is detected, mobile device 110 packages its cellular signaling in a packet wrapper and communicates with serving network element 160 via packet-switched network 140 and virtual base station 150. Thus, if access to a service is lost over conventional cellular channels, packet-switched network 140 may be used to provide home network services instead of the licensed spectrum typically used by mobile device 110.

Figure 2:
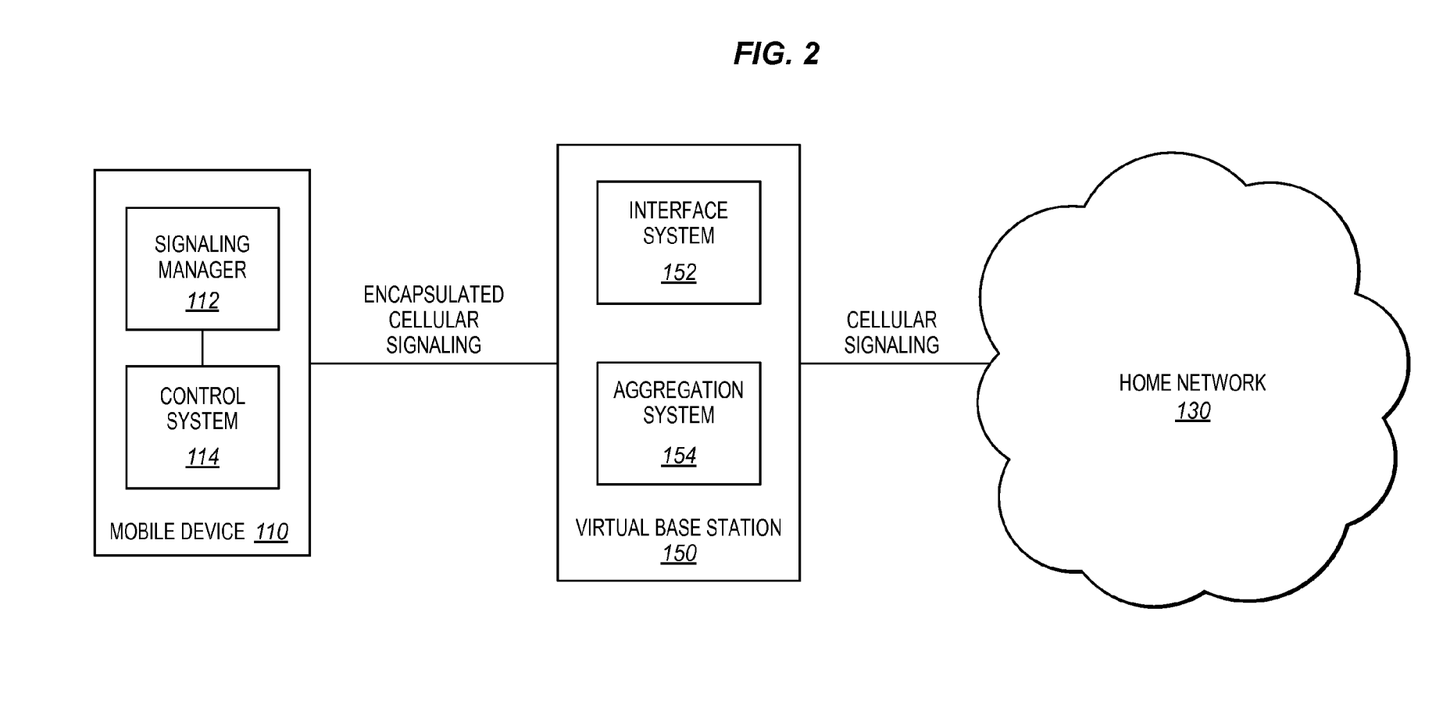
FIG. 2 is a block diagram illustrating details of a mobile device in communication with a virtual base station in an exemplary embodiment.

FIG. 2 is a block diagram illustrating details of a mobile device 110 in communication with a virtual base station 150 in an exemplary embodiment. In this embodiment, mobile device 110 comprises signaling manager 112 and control system 114. Signaling manager 112 is operable to generate cellular signaling for mobile device 110 and to exchange this cellular signaling with base station 120 of home network 130 (e.g., via an air interface using licensed spectrum). Control system 114 is operable to detect triggering conditions for mobile device 110 as it communicates with home network 130. Responsive to detecting the triggering event, control system 114 is operable to receive cellular signaling from signaling manager 112, to package the cellular signaling in a packet wrapper (e.g., an wrapper for a packetized transport layer protocol), and to forward the packaged signaling to virtual base station 150 of home network 130 via packet-switched network 140.

Virtual base station 150 may be integrated into a packet-switched server, or may be integrated into a component of home network 130 operable to receive packet-based signaling. In this embodiment, virtual base station 150 comprises interface system 152 and aggregation system 154. Interface system 152 is operable to receive cellular signaling in a packet wrapper (sent by mobile device 110), and to unwrap the signaling for processing by serving network element 160 of home network 130 (i.e., a home network element to which the signaling is targeted or routed, such as an MSC of home network 130). Interface system 152 is also operable to encapsulate cellular signaling from home network 130 in a packet wrapper and to forward the encapsulated signaling to mobile devices like mobile device 110.

Aggregation system 154 is operable to register mobile devices such as mobile device 110 at virtual base station 150 and to direct home network 130 to forward cellular signaling for mobile device 110 to virtual base station 150. For example, aggregation system 154 may invoke cellular signaling protocols and procedures to cause the updating or addition of a record in a home subscriber server (HSS) or a home location register (HLR) in order to ensure that network signaling directed to mobile device 110 is properly forwarded to virtual base station 150 for transmission. Aggregation system 154 may further be operable to direct home network 130 to forward cellular signaling for specific services to virtual base station 150, yet continue to direct cellular signaling for other services to base station 120.

Virtual base station 150 may also comprise an authentication system operable to determine, based upon the cellular signaling, that mobile device 110 is a subscriber of home network 130 (i.e., that a mobile device's "home" is the home network) and a subscriber of the cellular signaling forwarding service. This authentication system may be implemented, for example, with a Remote Authentication Dial In User Service (RADIUS) system, or with standard cellular authentication features known to a person having ordinary skill in the art.

To home network 130, virtual base station 150 appears to be no functionally different than other base stations. Thus, no upgrades to existing equipment or services at home network 130 are required in order to integrate them with virtual base station 150. Furthermore, virtual base station 150, by implementing packet-based backhaul signaling (e.g., IP-based backhaul signaling), enables the provision of home network services that typically use cellular signaling protocols, even when connections over licensed cellular spectrum are undesirable for mobile device 110.

Further details of the operation of mobile device 110 and virtual base station 150 will be discussed with regard to FIG. 3. Assume, for this embodiment, that mobile device 110 has been activated in an area covered by home network 130. Mobile device 110 registers with base station 120 of home network 130 and initiates cellular signaling in order to provide a service to the user (e.g., voice services, music or video services, text messaging services, multimedia messaging services, gaming services, smartphone applications, location-based services, contact management services, message-waiting indicators, etc.).

During the provision of services via base station 120, signaling manager 112 of mobile device 110 generates cellular signaling. Cellular signaling typically comprises an air-interface and application-layer protocol in accordance with 3GPP (GSM, W-CDMA, LTE) or 3GPP2 (CDMA) standards. Signaling for the cellular protocol may be generated using any systems, devices, and methods known to those of ordinary skill in the art. Furthermore, the signaling from signaling manager 112 may be associated with a specific service provided by home network 130 (e.g., the signaling may be for a text service, voice service, video service, etc.).

Signaling manager 112 exchanges generated cellular signaling with base station 120 of home network 130. The signaling is typically exchanged via licensed spectrum (e.g., licensed radio channels or bands). For example, signaling manager 112 may establish an air interface with base station 120 of home network 130. An air interface may be established by searching a set of control channels to detect base stations of home network 130, detecting a base station 120 having the strongest signal along its associated control channel, registering with home network 130 via base station 120, and communicating with base station 120 over licensed spectrum. The signal transmission process may be dictated based upon the standards for the cellular protocol used by mobile device 110, or may be dictated by proprietary standards of home network 130. Furthermore, home network 130 may update a record in a home location register (HLR) or a home subscriber server (HSS) of home network 130 to indicate that incoming signaling from the network should be routed to mobile device 110 via base station 120.

Figure 3:
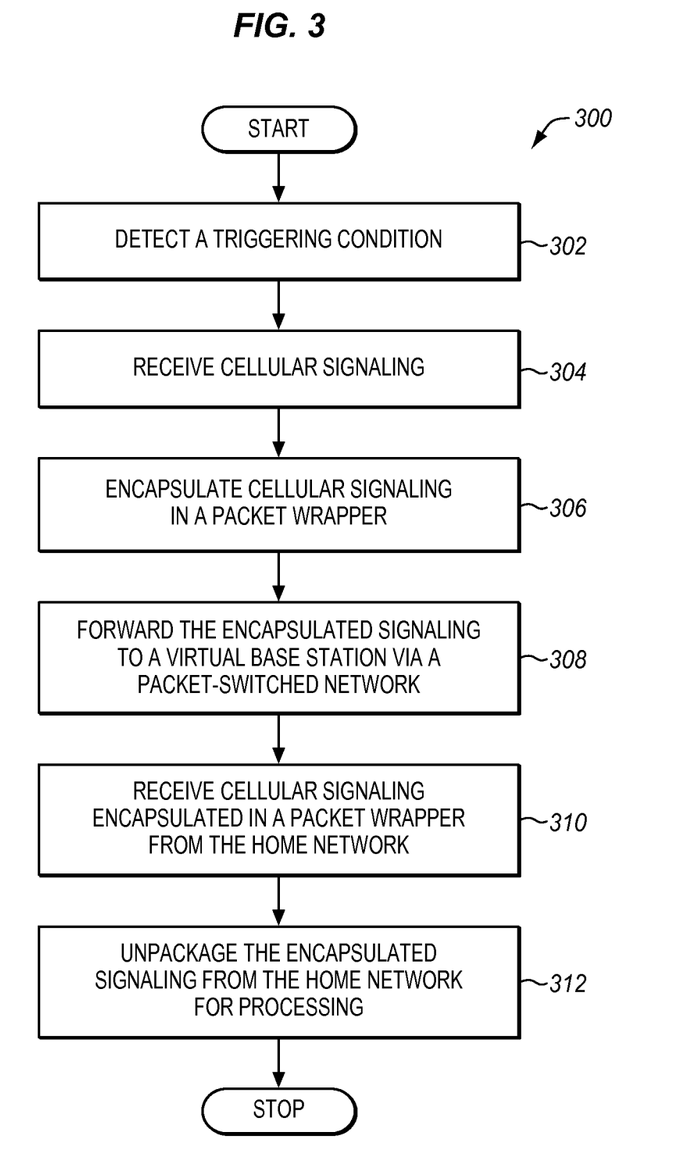
FIG. 3 is a flowchart illustrating a method for forwarding cellular signaling in an exemplary embodiment.

FIG. 3 is a flowchart illustrating a method 300 for forwarding cellular signaling in an exemplary embodiment. The steps of method 300 are described with reference to mobile device 110 and virtual base station 150 of FIG. 1, but those skilled in the art will appreciate that method 300 may be performed in other systems. The steps of the flowcharts described herein are not all inclusive and may include other steps not shown. The steps described herein may also be performed in an alternative order.

In step 302, control system 114 of mobile device 110 detects a triggering condition. A triggering condition comprises an event or circumstance that makes it favorable for signaling normally provided via an air interface with base station 120 of home network 130 to be forwarded via packet-switched network 140. For example, a triggering condition may be detected when mobile device 110 determines that it has left home network 130 and is now roaming, and mobile device 110 further determines that packet-switched network 140 is available. Mobile device 110 may also query the roaming network to determine the price of the roaming services provided by the network (e.g., the roaming network may provide these prices in a table periodically transmitted to mobile device 110). In one embodiment, if the price of a roaming service is above a certain threshold value, mobile device 110 classifies the roaming as "expensive," and determines that this constitutes a triggering condition. In a further embodiment, triggering conditions relate to specific services provided to mobile device 110 by home network 130 (e.g., text or picture messaging, video services, etc. provided by home network 130). Triggering conditions may also comprise a change in signaling quality over an air interface with base station 120, an incoming command from home network 130, a loss of a cellular service normally provided via the air interface with base station 120, or a change in price of a service.

In step 304, control system 114 receives cellular signaling from signaling manager 112. Control system 114 may receive the cellular signaling passively, or control system 114 may actively intercept communications from signaling manager 112 in order to transmit them across packet-switched network 140 instead of over an air interface to base station 120. In this manner, control system 114 may "trick" signaling manager 112 into believing that it is actually communicating with a base station available over an air interface. Thus, signaling manager 112 does not require additional logic or circuitry beyond that used to normally communicate with base stations of home network 130. Control system 114 may intercept signaling by detecting signaling directed towards a radio transmitter of mobile device 110 that uses licensed spectrum, and by routing this signaling to control system 114 for processing.

In step 306, control system 114 encapsulates the cellular signaling in a packet wrapper. Any tunneling technique may be used that preserves the format of the cellular signaling during transport. For example, control system 114 may wrap the cellular signaling in a comment (i.e., a section of signaling not processed by devices at packet-switched network 140). It may be desirable to strip off physical-layer signaling before encapsulating the data, in order to reduce packet size.

In one embodiment, the encapsulation process is performed according to a cryptographic security protocol (e.g., IPsec) in order to ensure that the data is not traced, captured, or interpreted by third parties. When the data is "tunneled" with a cryptographic security protocol, it is preferable to separate bearer from control signaling. For control signaling, the cellular signaling could be encapsulated by a TCP segment within an IP packet within an IPsec tunnel. For bearer, the cellular signaling could be encapsulated by a UDP segment within an IP packet within an IPsec tunnel. For data bearer services, there may be additional tunneling and layers embedded in the data stream from the mobile (e.g., user plane TCP acknowledgements), carried transparently during the forwarding process.

In step 308, control system 114 forwards the encapsulated signaling to virtual base station 150 via packet-switched network 140. In order to forward the encapsulated signaling, control system 114 first connects to packet-switched network 140. Therefore, wireless technology may be used to detect and contact a wireless local area network (WLAN) in communication with packet-switched network 140, or wired methods (e.g., a USB or Ethernet port) may be used. Forwarding the encapsulated signaling includes packetizing and transmitting the encapsulated cellular signaling.

Once signaling has been transmitted to home network 130 via packet-switched network 140, it is desirable for mobile device 110 to initiate two-way communications by processing incoming communications from home network 130 sent via packet-switched network 140. The process is illustrated below with regard to steps 310 and 312.

In step 310, control system 114 receives encapsulated cellular signaling from home network 130 (e.g., cellular signaling encapsulated in a packet wrapper), and in step 312, control system 114 unpackages the encapsulated signaling from home network 130 for processing. During unpackaging, cellular signaling is extracted from a packet wrapper, and control system 114 may assemble streams of the extracted data into sets of distinct cellular messaging. Once the cellular signaling has been unpackaged and assembled, control system 114 transmits this signaling to signaling manager 112 for further processing. In one embodiment, control system 114 processes the incoming signaling itself Implementing the method discussed above, a mobile device (e.g., cellular phone) may communicate with its home network using the licensed spectrum of the home operator when it is accessible, yet take advantage of available connections to packet-switched networks when an air interface with a base station of the home network has been lost. Furthermore, because the incoming and outgoing packet-based signaling preserves the format of the cellular protocol (used by the mobile device and the home network), it is possible for the home network to provide in-network services that would normally be incompatible with packet-based signaling protocols.

Note that a data application, such as a web browser that does not need the services of the home network, may bypass all of the above once access to packet-switched network 140 is established. For sophisticated mobile devices, control system 114 may permit these data applications to operate in a purely "Wi-Fi" mode in order to avoid overhead associated with the cellular forwarding techniques described above.

Figure 4:
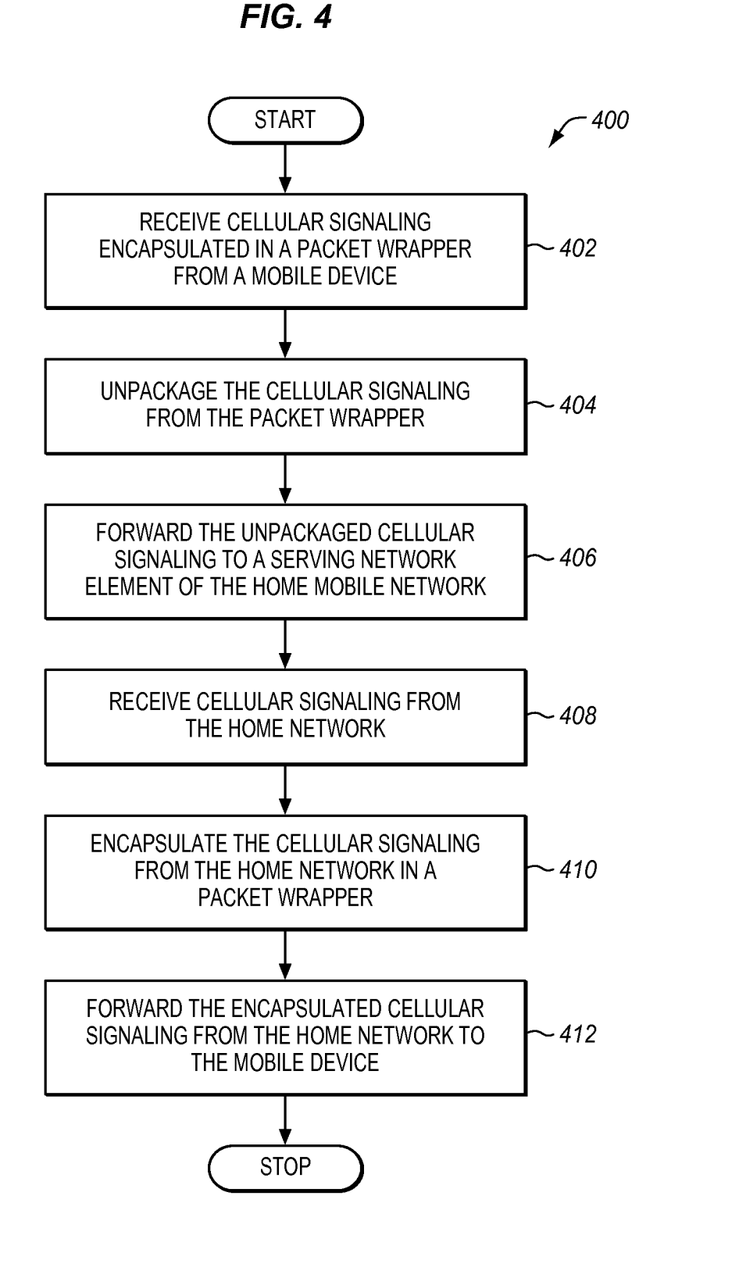
FIG. 4 is a flowchart illustrating an additional method for forwarding cellular signaling in an exemplary embodiment.

FIG. 4 is a flowchart illustrating an additional method 400 for forwarding cellular signaling in an exemplary embodiment. The steps of method 400 are described with reference to mobile device 110 and virtual base station 150 of FIG. 1, but those skilled in the art will appreciate that method 400 may be performed in other systems. The steps of the flowcharts described herein are not all inclusive and may include other steps not shown.

Assume, for this embodiment, that virtual base station 150 has established communications with home network 130, and awaits incoming data from mobile device 110, sent via packet-switched network 140. In step 402, virtual base station 150 receives cellular signaling encapsulated in a packet wrapper and sent by mobile device 110. This encapsulated signaling is received via packet-switched network 140. In step 404, interface system 152 of virtual base station 150 unpackages the cellular signaling from the packet wrapper, which may occur in a similar fashion to the unpackaging discussed above with regard to step 312 of FIG. 3. Once the incoming signaling has been unpackaged, it is ready for processing by home network 130. Thus, in step 406, aggregation system 154 forwards the unpackaged cellular signaling to a serving network element 160 (e.g., an MSC or S-MSC) of home network 130. This serving element then routes the cellular signaling through home network 130 to an appropriate destination.

Virtual base station 150 is not only operable to process incoming signaling sent by mobile device 110, but also is operable to process outgoing signaling from home network 130 that is directed to mobile device 110. Steps 408-412 serve to illustrate this process. In step 408, virtual base station 150 receives cellular signaling from home network 130, and in step 410, interface system 152 of virtual base station 150 encapsulates the cellular signaling from home network 130 into a packet wrapper. This process may occur in a similar fashion to step 306, described above. In step 412, interface system 152 forwards the cellular signaling to mobile device 110 via packet-switched network 140, thereby maintaining communications with mobile device 110.

In further embodiments, virtual base station 150 may direct home network 130 to forward signaling for mobile device 110 to virtual base station 150. This ensures that the signaling is not transmitted to mobile device 110 across the air interface with base station 120, thereby conserving bandwidth on the licensed spectrum. For example, virtual base station 150 may register mobile device 110 with home network 130. In one embodiment, aggregation system 154 may initiate registration of mobile device 110 with home network 130. To elements of home network 130, the registration process appears to be no different than a registration with a physical base station (i.e., the type and format of messages sent and received by serving network element 160 appear to be in the cellular protocol). However, during the registration process, interface system 152 packages outgoing commands from home network 130 into a packet wrapper, and unwraps incoming wrapped commands from mobile device 110 so that they may be forwarded to home network 130 in the cellular protocol. Thus, method 400 achieves similar benefits to those described above for method 300.

EXAMPLES

In the following examples, additional processes, systems, and methods are described in the context of cellular signal forwarding achieved over a packet-switched network.

Figure 5:
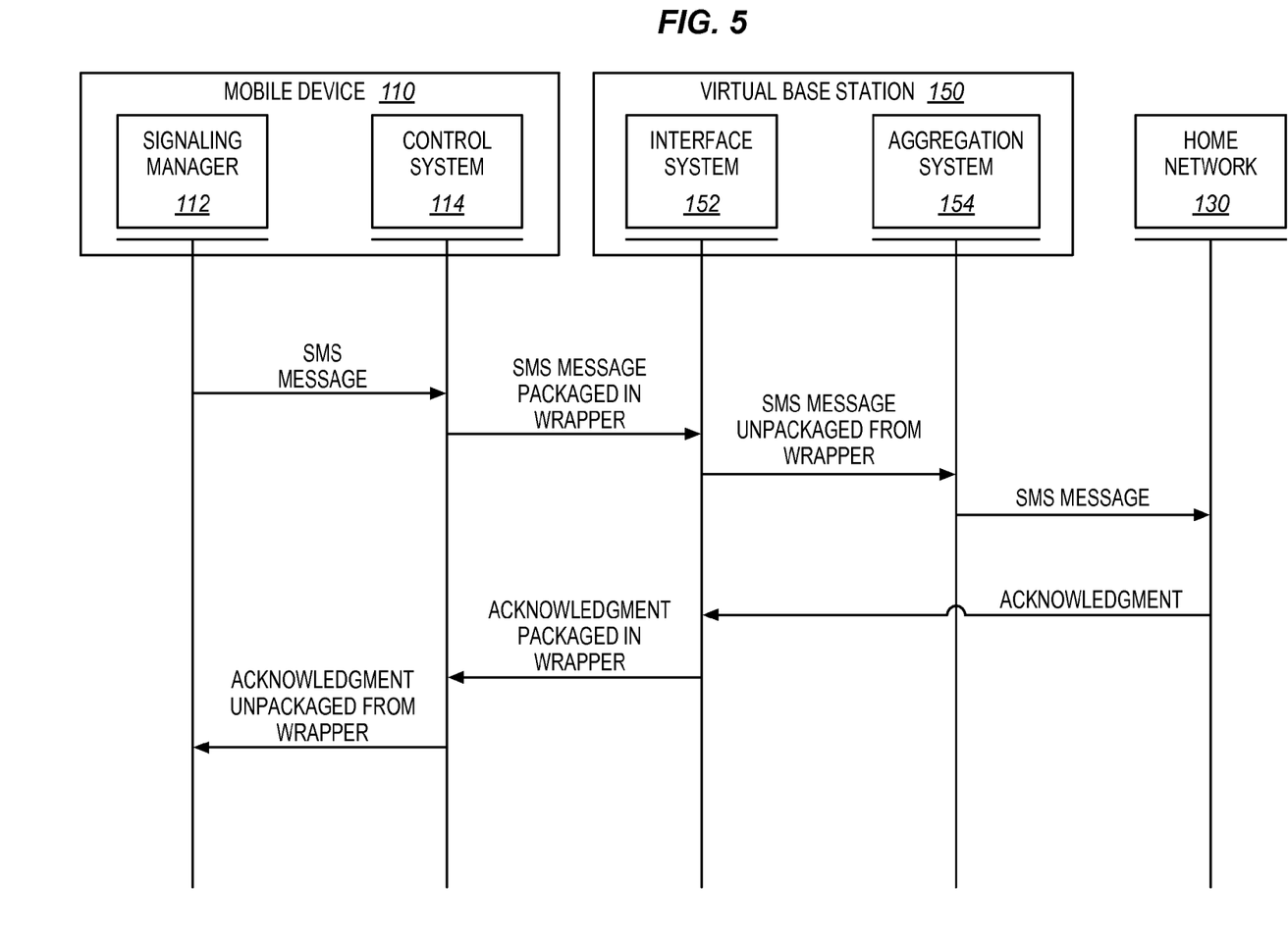
FIG. 5 illustrates a message diagram where a text message is generated at a mobile device and provided to a home network according to the methods of FIGS. 3 and 4.

FIG. 5 illustrates a message diagram where a text message is generated at a mobile device 110 and provided to a home network 130 according to the methods of FIGS. 3 and 4. In this example, additional processes, systems, and methods are described in the context of mobile device 110.

FIG. 5 illustrates a message diagram where a text message is generated at a mobile device 110 and provided to a home network 130 after a triggering condition has been detected. Here, signaling manager 112 generates an SMS text message according to SMS conveyance protocols defined by 3GPP and 3GPP2. Signaling manager 112 attempts to send this message via an air interface with base station 120, but control system 114 intercepts the signaling for the text message. Control system 114 packages the SMS message signaling for the text message in a packet wrapper, and transmits this wrapped signaling to interface system 152 of virtual base station 150 via the internet. Interface system 152 unpackages the SMS message signaling from the packet wrapper, and forwards the signaling to aggregation system 154. Aggregation system 154 determines that mobile device 110 is a subscriber of home network 130, ensures that a subscriber record at a Home Location Register (HLR) of home network 130 is updated, and forwards the unpackaged text message across home network 130.

Home network 130 processes the text message (e.g., by routing the message to its recipient), and generates an acknowledgement message that the text message has been processed. This acknowledgment is also generated according to according to SMS conveyance protocols defined by 3GPP and 3GPP2. Home network 130 transmits the acknowledgment message to interface system 152 of virtual base station 150. Interface system 152 packages the acknowledgment message in a packet wrapper, and transmits it (via the internet) to control system 114. Control system 114 unpackages the acknowledgment, and transmits it to signaling manager 112 for processing. Signaling manager 112 then processes the unpackaged signaling and displays the acknowledgment to a user. Thus, network communications are established between mobile device 110 and home network 130, over the internet, yet without the need to translate network commands or to substantially alter the existing structure of home network 130 and mobile device 110.

In an additional example, mobile device 110 halts transmission of signaling via an air interface when it detects a triggering event. In this embodiment, control system 114 detects a triggering condition when it compares a characteristic (e.g., signal noise, percentage of lost data, bandwidth, latency, etc.) for a service of home network 130 to a characteristic of packet-switched network 140, and determines that packet-switched network 140 is preferable. Once a triggering condition has been detected, control system 114 directs signaling manager 112 to halt transmission of signaling to base station 120 of home network 130. Control system 114 may direct signaling manager 112 to halt all signaling to base station 120, or may direct signaling manager 112 to halt signaling relating to specific services of home network 130 (e.g., SMS services or voice services). This decision may depend upon the characteristics of the services (e.g., latency or bandwidth requirements, cost, etc.) and the nature of the triggering condition (e.g., the degree of change in the latency for the air interface, bandwidth, cost, etc.). For example, a voice service may be extremely sensitive to latency issues, while a text messaging service may not be. Thus, in response to detecting poor signal latency, control system 114 may decide to halt transmission of voice signaling over the air interface, but may continue transmission of text and multimedia services over the air interface. Prior to halting transmission, signaling manager 112 may transmit information to base station 120 indicating that mobile device 110 has decided to terminate communications over the air interface.

Any of the various elements shown in the figures or described herein may be implemented as hardware, software, firmware, or some combination of these. For example, an element may be implemented as dedicated hardware. Dedicated hardware elements may be referred to as "processors,"

"controllers," or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

I claim:

1. A mobile device, comprising:
a signaling manager operable to exchange cellular signaling with a base station of a home network of the mobile device; and
a control system operable to detect a triggering condition, to receive the cellular signaling from the signaling manager responsive to detecting the triggering condition, to encapsulate the cellular signaling in a packet wrapper, and to forward the encapsulated signaling to a virtual base station via a packet-switched network,
the control system further operable to receive encapsulated signaling sent by the home network via the packet-switched network, to unpackage cellular signaling from the encapsulated signaling sent by the home network, and to transmit the unpackaged cellular signaling to the signaling manager.

2. The mobile device of claim 1, wherein
the cellular signaling comprises signaling in accordance with Long-Term Evolution (LTE) standards.

3. The mobile device of claim 1, wherein
the control system is further operable to detect a loss of contact with the base station of the home network as a triggering condition.

4. The mobile device of claim 1, wherein
the control system is further operable to detect a change in a price of a messaging service provided by the home network as a triggering condition.

5. The mobile device of claim 1, wherein
the control system is further operable to detect that the mobile device is roaming as a triggering condition.

6. The mobile device of claim 5, wherein
the control system is further operable to determine a price of roaming, and to detect expensive roaming as a triggering condition.

7. The mobile device of claim 1, wherein
the control system is further operable to encapsulate the cellular signaling using a cryptographic security protocol.

8. The mobile device of claim 1, wherein
the control system is further operable to detect a wireless local area network (WLAN), to access the packet-switched network via the WLAN, and to forward the encapsulated signaling to the virtual base station via the WLAN.

9. A method comprising:
exchanging cellular signaling with a base station of a home network of a mobile device;
detecting a triggering condition;
encapsulating the cellular signaling in a packet wrapper responsive to detecting the triggering condition;
forwarding the encapsulated signaling to a virtual base station via a packet-switched network;
receiving encapsulated signaling sent by the home network via the packet-switched network;
unpackaging cellular signaling from the encapsulated signaling sent by the home network; and
processing the unpackaged cellular signaling.

10. The method of claim 9, wherein:
the cellular signaling comprises signaling in accordance with Long-Term Evolution (LTE) standards.

11. The method of claim 9, wherein
detecting a triggering condition comprises determining that the mobile device has lost contact with the base station of the home network.

12. The method of claim 9, wherein
detecting a triggering condition comprises determining that a price of a messaging service has changed.

13. The method of claim 9, wherein
detecting a triggering condition comprises determining that the mobile device is currently roaming.

14. The method of claim 13, wherein
detecting a triggering condition further comprises determining that a price of roaming for the mobile device is expensive.

15. The method of claim 9, wherein
the cellular signaling is encapsulated using a cryptographic security protocol.

16. The method of claim 9, further comprising
detecting a wireless local area network (WLAN); and
accessing the packet-switched network via the WLAN,
wherein forwarding the cellular signaling comprises transmitting the cellular signaling to the virtual base station via the WLAN.

* * * * *